No. 894,098. PATENTED JULY 21, 1908.
L. BAILEY.
FERTILIZER DISTRIBUTER.
APPLICATION FILED APR. 4, 1908.
2 SHEETS—SHEET 1.
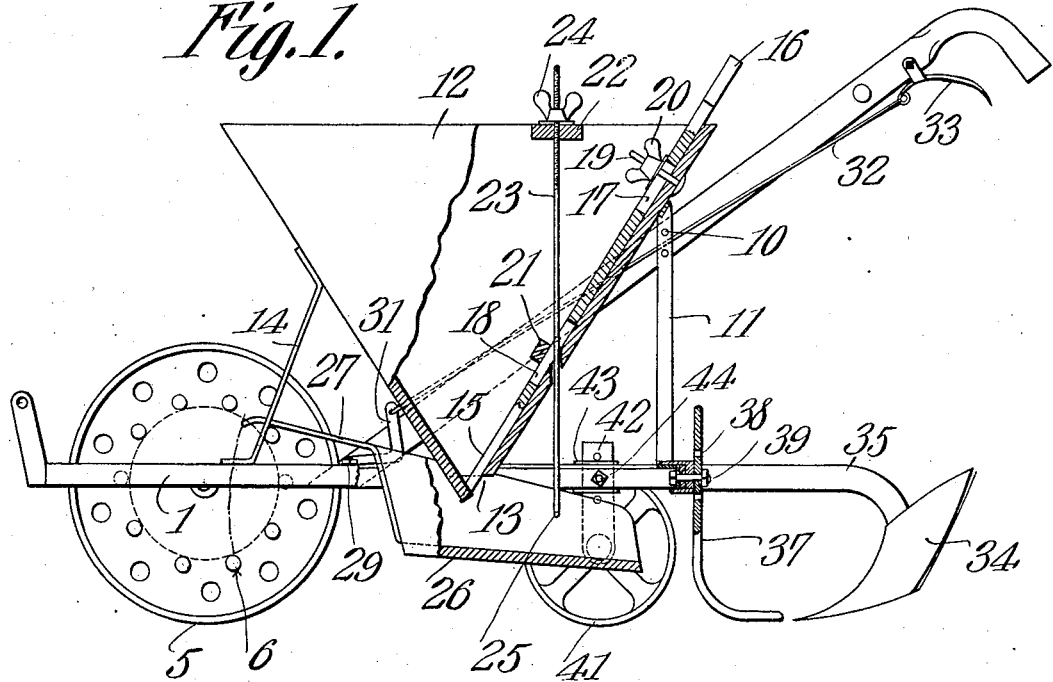
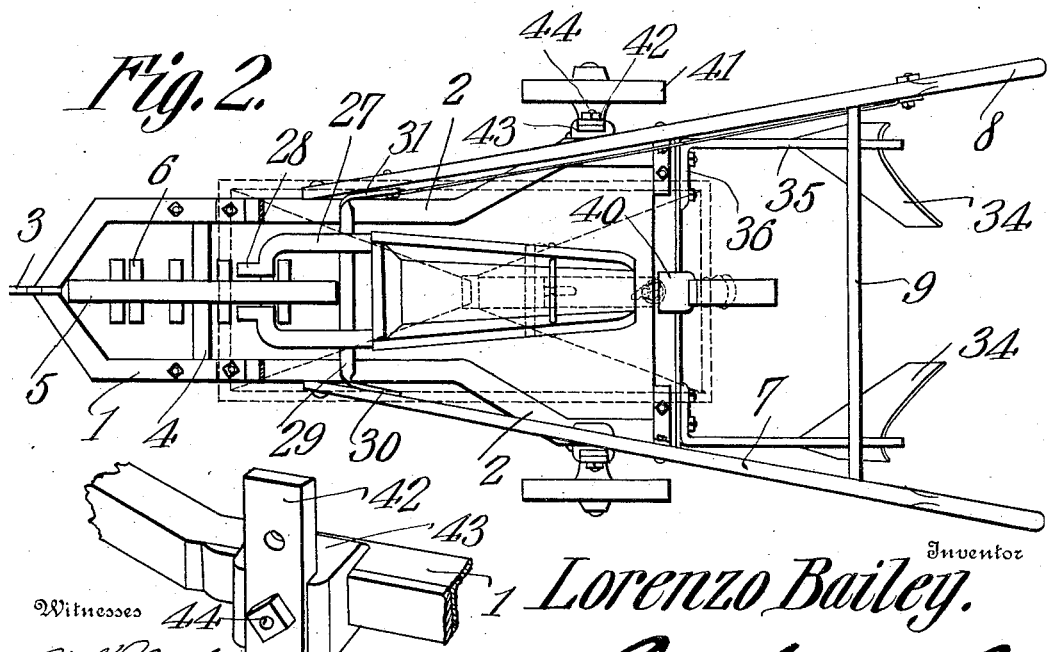
Inventor
Lorenzo Bailey.

No. 894,098. PATENTED JULY 21, 1908.
L. BAILEY.
FERTILIZER DISTRIBUTER.
APPLICATION FILED APR. 4, 1908.

2 SHEETS—SHEET 2.

Lorenzo Bailey,
Inventor.

Witnesses.

By C. A. Snow & Co.,
Attorneys.

UNITED STATES PATENT OFFICE.

LORENZO BAILEY, OF WINDSOR, VIRGINIA.

FERTILIZER-DISTRIBUTER.

No. 894,098.  Specification of Letters Patent.  Patented July 21, 1908.

Application filed April 4, 1908. Serial No. 425,273.

*To all whom it may concern:*

Be it known that I, LORENZO BAILEY, a citizen of the United States, residing at Windsor, in the county of Isle of Wight and State of Virginia, have invented a new and useful Fertilizer-Distributer, of which the following is a specification.

This invention relates to fertilizer distributers and its object is to provide a device of this character which is simple, durable and efficient, can be readily manipulated, and which is provided with means whereby the amount of fertilizer distributed can be readily governed.

A further object is to provide novel means for agitating the discharge trough of the fertilizer, said trough being actuated by projections upon the wheel of the distributer, the projections and that part of the trough cooperating therewith being proportioned so that the same can be readily shifted into or out of coöperative relation.

With these and other objects in view the invention consists of certain novel features of construction and combinations of parts which will be hereinafter more fully described and pointed out in the claims.

In the accompanying drawings is shown the preferred form of the invention.

Figure 4:
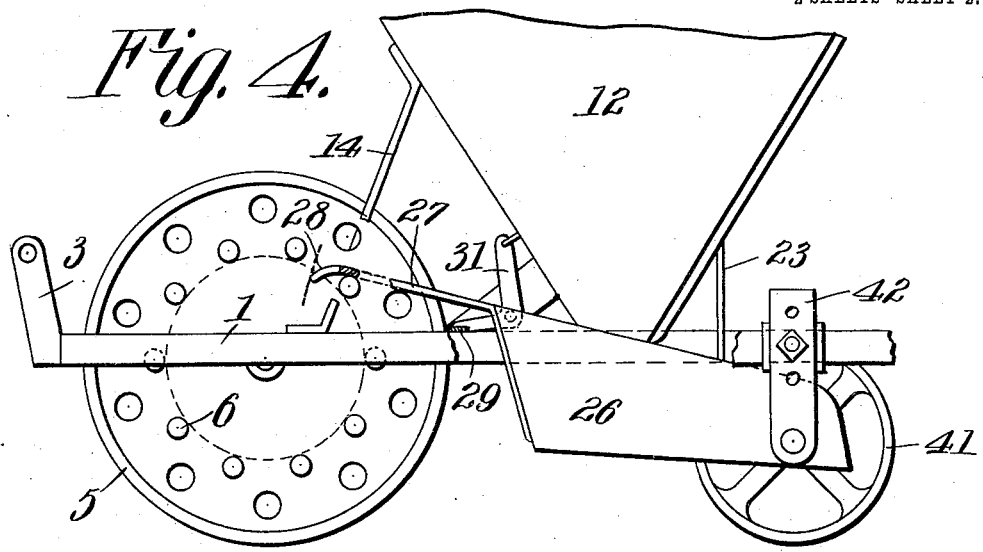
Figure 5:
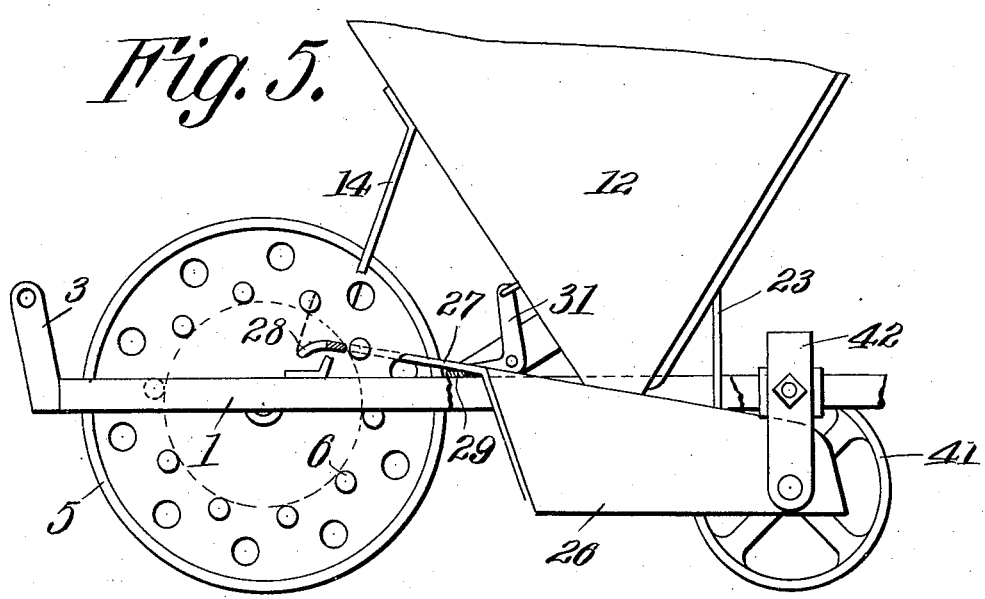

In said drawings: Figure 1 is a view partly in side elevation and partly in section of the distributer. Fig. 2 is a plan view thereof with the hopper removed, said hopper being shown by dotted lines. Fig. 3 is a detail view of the connection between one of the wheel hangers and the frame. Fig. 4 is a side elevation of a portion of the machine, one of the trough arms being broken away and its finger being shown in section and upon a tripping stud. Fig. 5 is a similar view showing the finger out of operative position.

Referring to the figures by characters of reference, 1 designates the frame of the machine, the same being preferably formed of angle iron and extended laterally at its rear end as shown at 2, the front end of the frame being secured to an upstanding arm or bracket 3 to which the draft animal or animals are to be attached. An axle 4 is secured to the side portions of frame 1 adjacent its front end and mounted on this axle is a main wheel 5 on each face of which is located a circular series of laterally extending studs 6 spaced apart at regular intervals and utilized for the purpose hereinafter set forth.

Upwardly diverging handles 7 are bolted or otherwise secured at their lower ends to the side portions of frame 1 while their upper ends terminate in suitable grips 8 and are connected by a cross rod 9 which serves to hold them properly spaced apart. These handles are also secured as shown at 10 to an upstanding yoke 11 which is bolted or otherwise fastened to the rear portion of the frame 1. This yoke is secured to the rear inclined wall of a hopper 12 all of the walls of which converge downwardly and form an outlet 13 therebetween at their lower ends. Braces 14 connect the front portion of the hopper with the frame 1 so as to coöperate with the yoke 11 to fixedly secure the hopper upon the frame.

As shown in Fig. 1 the front wall of the hopper extends downward below the plane of the inner surface of the rear wall of the hopper and constitutes an abutment for a sliding valve 15 in the form of an elongated strip extending upwardly upon the rear wall of the hopper and terminating in a handle 16. This strip has slots 17 and 18 therein one of which, 17, receives a guide bolt 19 on which is mounted a clamping device such as a wing nut 20 whereby the valve can be secured in any desired position to which it may be adjusted. A guide strip 21 extends over the strip 15 to assist in preventing displacement thereof. This valve strip 15 is of the same width as the opening 13 so that when it rests upon the downwardly projecting end of the front wall of the hopper it serves to practically close the opening 13 and thus prevent the discharge of fertilizer.

A cross strip 22 is secured upon the hopper and slidably mounted therein is a threaded rod 23 engaged by suitable adjusting means, such for example as a wing nut 24 and this rod extends through the lower slot 18 and also through an opening in the hopper and is provided at its lower end with laterally extending arms or trunnions 25. These trunnions constitute bearings for the sides of a trough 26 the rear end of which is open while the forward end thereof has downwardly extending arms 27 secured thereto. These two arms are spaced apart a distance greater than the distance between the outer ends of the two series of studs 6 as shown in Fig. 2 and the terminal portion of each arm is extended inwardly and forwardly to produce a tripping finger 28 designed to be successively contacted by the stud. It is to be understood that the distance from the trunnions or arms 25 to the rear edges of the fingers 28 is greater than the distance from said trunnions to the circle described by the innermost portions of the studs 6. This has been clearly indicated by dotted lines in Fig. 2. It will be apparent therefore that when the fingers 28 are resting upon the studs they will be successively contacted and raised thereby, and by backing the machine a short distance the studs above the fingers 28 will ride downward thereon and said fingers will assume positions within the circles described by the studs so that continued backward or forward movement of the machine can be produced without causing co-operation between the fingers 28 and studs 6.

Downward movement of the fingers 27 is limited by a cross strip 29 having a crank arm 30 at one end and a bell crank lever 31 at its other end, said arm and lever being pivotally connected to the two handles 7 close to their points of connection with the frame. The upstanding arm of the bell crank lever 31 has a rod 32 pivoted to it and extending upwardly along the inner surface of one of the handles 7, it being attached at its upper end to a short lever 33 pivoted to the handle 7 or close to the grip 8 therein.

When the arms 27 are resting on the cross strip 29 the fingers 28 thereof, as heretofore stated, rest within the circle described by the studs 6 and will not be actuated thereby no matter in what direction the machine may be moving. When, however, it is desired to produce a jumping motion of the trough 26 the operator pulls upwardly on lever 33 which causes a corresponding upward movement of strip 29. The arms 27 and the hopper 26 are therefore swung so as to bring the fingers 28 into the path of the studs 6, whereupon said studs in rotating will successively strike the fingers and cause a jumping movement of the trough. As shown in the drawings shovels or hoes 34 may be arranged in rear of the frame 1 at the sides thereof, the same being attached to arms or draw bars 35 having extensions 36 projecting at right angles therefrom and which are bolted or otherwise fastened to the rear end of the frame 1. These hoes or shovels are so positioned as to direct the loose soil inwardly so as to cover any fertilizer which may be discharged from the trough. A heel strip 37 having its lower portion rearwardly curved is preferably adjustably connected to the rear end of the frame at the center thereof. This heel portion has a plurality of apertures 38 in its upstanding portion designed to receive a securing bolt 39 which extends through the rear portion of the frame and also through a vertically curved block 40 which straddles the rear portion of the frame and has the foot seated within this groove, as indicated in Fig. 2.

Wheels 41 are preferably arranged at the sides of the frame, each wheel being mounted on a hanger 42 which is seated in the outer grooved face of a holding block 43. Each block is designed to straddle the side portion of the frame and a bolt 44 extends through said side portion, the block and the hanger for the purpose of securing the parts together. The hangers are adjustable vertically and when the hoes 34 and foot 37 are in use the wheels are preferably raised so as not to contact with the ground. In this event the foot 37 acts as a guide to limit the depth of the cut made by the hoes.

It is thought that the operation of this device will be fully understood from the foregoing description when read in connection with the accompanying drawing. Fertilizer is placed within the hopper 12 and the slide 15 is raised and secured so that a portion of the fertilizer may pass through the opening 13 and into the trough 26. When the machine is pushed forward the trough 26 will remain immovable relative to the other portions of the machine because the fingers 28 are normally located within the circle described by the studs 6. As soon as it is desired to distribute the fertilizer the operator pulls on lever 33 so as to cause strip 29 to raise arms 27. Fingers 28 will thus be brought into the path of the studs 6 which, as wheel 5 rotates, will successively raise and drop the fingers 28 and cause a corresponding rocking movement of the trough 26. This will result in the fertilizer being discharged from the rear end of the trough and the rapidity of this discharge can be regulated by changing the inclination of the trough. This is shown by means of rod 23 and nut 24. It is of course to be understood that as soon as fertilizer is discharged the hoes 34 operate to cover it. Of course, while the machine is being operated in this manner the wheels 41 are raised out of contact with the ground. In moving to or from a field, however, the wheels can be adjusted so as to lift the hoes and the foot out of contact with the ground. If desired, these wheels 41 can be employed as means for limiting the depth of the cut produced by the hoes, in which event the foot 37 will not be necessary.

What is claimed is:

1. The combination with a main wheel and a circular series of outstanding studs thereon; of a frame movable with said wheel, a trough pivotally mounted upon the frame, and an arm extending from the trough and normally located at one side of the wheel and within the circle described by the studs, and means for shifting the arm area from the center of the wheel and into position to be successively contacted by the stud.

2. In a fertilizer distributer a main wheel, laterally extending studs thereon arranged in a circle concentric with the wheel, a pivotally supported trough, an arm extending therefrom and disposed to successively rest upon the studs, said studs being disposed when the wheel is turned in one direction to shift the arm toward the center of the wheel and out of the path of the studs.

3. In a fertilizer distributer the combination with a main wheel and a series of laterally extending studs upon the wheel and arranged in a circle concentric with the wheel; of a pivotally supported trough, an arm extending therefrom and having a laterally offset finger disposed to bear upon the studs, said studs being disposed, when the wheel is revolved in one direction, to shift the finger toward the center of the wheel and out of the path of the studs.

4. In a fertilizer distributer the combination with a main wheel and laterally extending spaced studs upon one face thereof and in a circle concentric with the wheel; of an adjustably and pivotally supported trough, an arm extending therefrom and having a laterally offset finger normally disposed at one side of the wheel and within the circle described by the studs, and means for shifting said finger away from the center of the wheel and into the path of the studs to be successively contacted thereby.

5. In a fertilizer distributer the combination with a frame, a hopper thereon, and a pivotally and adjustably supported trough below the hopper; of a wheel journaled within the frame, laterally extending studs thereon disposed in a circle concentric with the wheel, an arm extending from the trough and normally projecting into the circle described by the studs, said arm being disposed constantly at one side of the wheel, and manually operated means for shifting said arm away from the center of the wheel and into the path of the studs to be succesively contacted thereby.

6. In a fertilizer distributer the combination with a frame, a hopper supported thereabove, and an adjustably and pivotally supported trough below the hopper; of a main wheel journaled within the frame, oppositely extending studs upon the wheel and disposed in circles concentric with the wheel, arms extending from the trough and having laterally offset fingers normally disposed within the circle described by the studs, a lifting device upon the frame for shifting the arms away from the center of the wheel and into the paths of the studs, and means for actuating said device.

7. In a fertilizer distributer the combination with a frame, a hopper thereon, a trough mounted to rock below the hopper, and means operated by the movement of the frame for actuating the trough; of hangers adjustably and detachably mounted upon the frame, wheels journaled upon the hangers, a foot adjustably and detachably mounted upon the rear portion of the frame, and rearwardly and downwardly extending hoes secured to the rear end of the frame at the sides thereof, said foot being in rear of the trough and the hoes being arranged to cover material discharged from the trough and under the foot.

8. The combination with a portable frame and a hopper thereon; of a trough mounted to rock below the hopper, means operated by the movement of the frame for actuating the trough, an adjusting rod extending through the hopper, means engaging one end thereof for adjusting and supporting the same relatively to the hopper, and laterally extending arms upon the lower portions of the rod and between the sides of and constituting bearings for the trough.

In testimony that I claim the foregoing as my own, I have hereto affixed my signature in the presence of two witnesses.

LORENZO BAILEY.

Witnesses:
  B. L. ROBERTS,
  PARKE P. DEANS.